July 11, 1961  R. T. MARETTE  2,991,763
ACTUATOR
Filed July 27, 1959  3 Sheets-Sheet 2

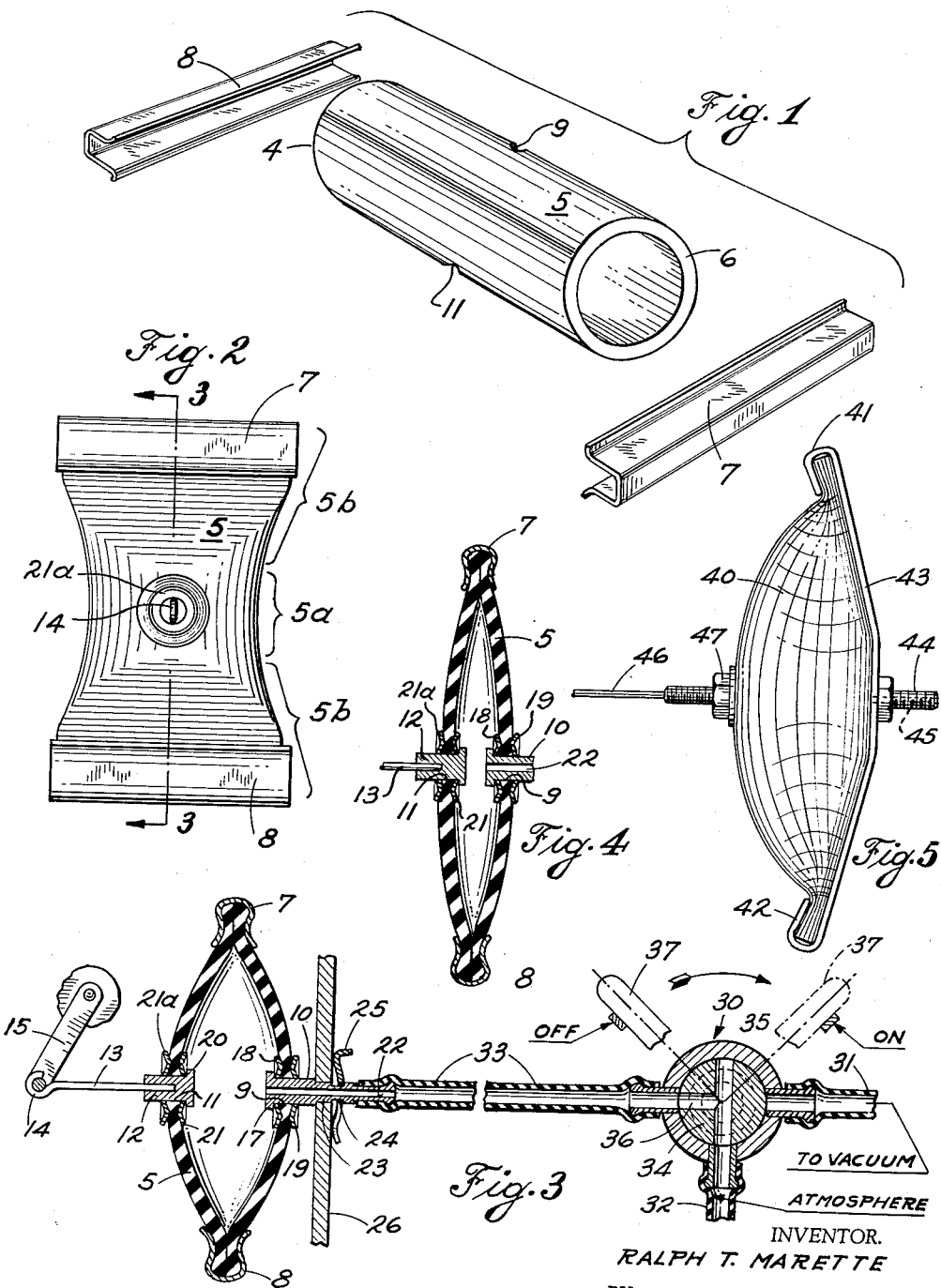

INVENTOR.
RALPH T. MARETTE
BY
RICHEY, McNENNY & FARRINGTON
Donald W. Farrington
ATTORNEYS

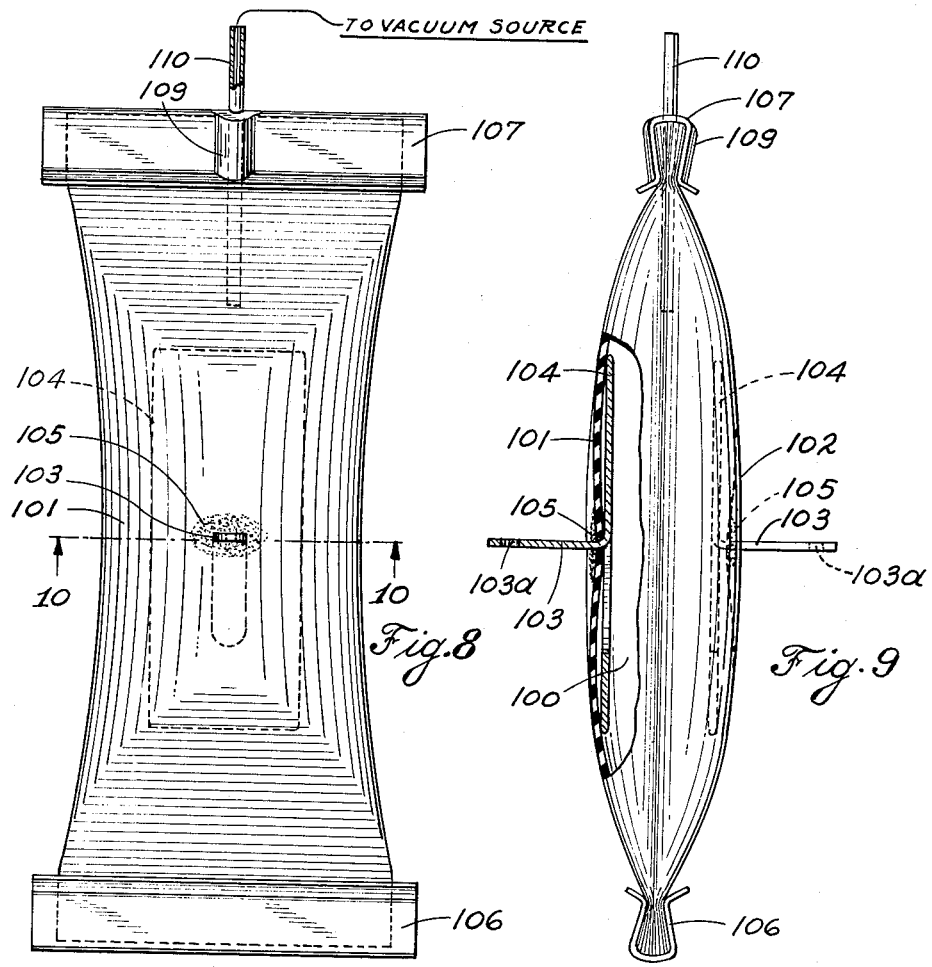
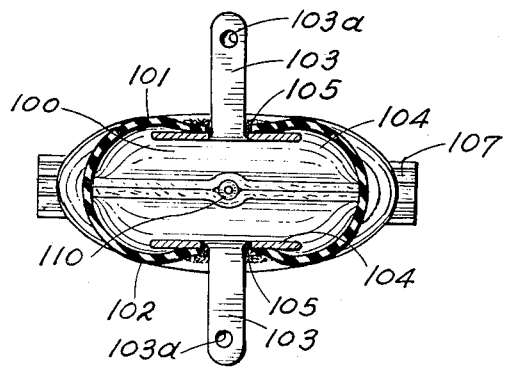

United States Patent Office 2,991,763
Patented July 11, 1961

2,991,763
ACTUATOR
Ralph Thomas Marette, Cleveland Heights, Ohio, assignor to The Weatherhead Company, Cleveland, Ohio, a corporation of Ohio
Filed July 27, 1959, Ser. No. 829,718
18 Claims. (Cl. 121—48)

This invention relates to an actuator and more particularly to a vacuum responsive actuator arranged to move a remotely located device by selectively connecting the actuator to either a source of vacuum or to atmosphere.

It is among the objects of my invention to provide an actuator and a method of making the actuator wherein a length of rubber hose or tubing is closed at each end thereof to provide a chamber and wherein said chamber is provided with a passageway adapted to lead atmospheric air into the chamber or to exhaust the chamber by connecting it to a source of vacuum and wherein the change in dimensions due to exhausting the actuator is utilized to operate an actuated device.

It is a further object of my invention to provide a method of making an actuator wherein the steps of the method include the cutting of a length of rubber hose or tubing, pressing the cut ends together and gripping them in a clamp to form an elongated actuator having a rounded central portion and flat end portions and wherein the central portion is normally biased to assume the cylindrical shape of the cut length of hose or tubing.

Further objects and advantages relating to low cost of manufacture, efficiency in operation and compact construction will appear from the following description and the appended drawings wherein:

FIG. 1 is an exploded perspective view showing the cut length of hose or tubing and the clamping members for holding the cut ends of the tube together;

FIG. 2 is a plan view of the actuator with the cut ends clamped together;

FIG. 3 is an elevation with parts in section showing the actuator mounted for use;

FIG. 4 is a sectional elevation showing the shape of the actuator when connected to a source of vacuum;

FIG. 5 is an elevation of a modified form of actuator made according to my invention;

FIG. 8 is a plan view of a modified form of actuator;

FIG. 9 is an elevation with parts in section of the form illustrated in FIG. 8; and FIG. 10 is a sectional view taken on the plane indicated at 10—10 of FIG. 8.

Figure 6:
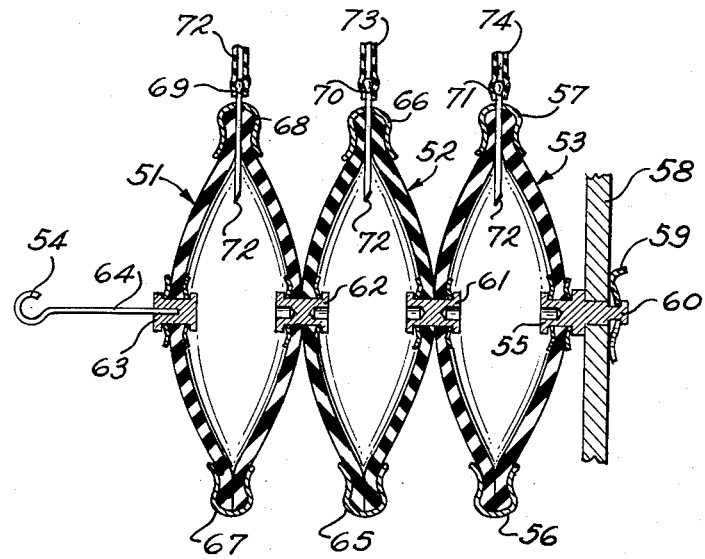
FIG. 6 is a sectional elevation illustrating a tandem arrangement of actuators made according to my invention wherein each actuator may be sequentially operated.

Referring to the drawings, a cut length of rubber tubing or hose 5 is arranged as shown in FIG. 1 and the cut ends 6 and 4 thereof are pressed together or flattened and are clamped in their flattened condition by a clamp at each end such as the clamps 7 and 8. The clamps 7 and 8 are preferably of metal and are proportioned so that the sides are resiliently biased towards each other to exert a sealing pressure on the tube when forced over the cut ends 4 and 6. When the cut section 5 is thus flattened at each end it acquires a shape such as shown in plan view in FIG. 2 wherein the central section, as at 5a, is characterized by a substantially circular cross-section and the portions 5b merge into flattened areas gripped by the U-shaped clamps 7 and 8. The original cylindrical formation of the tubing or hose 5 causes the actuator walls to take the shape shown in FIG. 3 when the interior of the actuator is opened to atmosphere. One side wall of the actuator is provided with an aperture 9 to receive the inlet fitting 10 and the opposite wall of the actuator as at 11 is apertured to receive a fitting 12 for transmitting the motion of the actuator to rod 13 provided with an eyelet 14.

The eyelet 14 is shown as connected to a lever 15 for operating a damper or valve which may be located in the heating or air conditioning system of an automobile. It will be understood as the description proceeds that although the actuator of my invention is well suited for automotive uses, it may be employed wherever different relative pressures are available.

The fitting 10 includes a head portion 17 and a washer 18 at the interior of the actuator. The fitting 10 and the washer 18 carried under the head 17 is inserted at the interior of the actuator before the cut ends are clamped by the clamps 7 and 8. After the fitting 10 is thus inserted, a washer 19 is placed on the outside wall of the actuator 5.

The fitting 12 on the other side of the actuator wall is similarly assembled and includes an enlarged head portion 20, a washer 21 is carried thereby and the shank of the fitting is inserted from the interior of the actuator before the ends are clamped together. An outside washer 21a is placed upon the fitting 12. A cylindrical mandrel is inserted into the open end of the cut length after the fittings 10 and 12 are assembled. The mandrel supports the fittings while the washers are staked or otherwise secured to the fittings.

The shank portion 10 having the inlet bore 22 therein is provided with a reduced diameter 23 at its end and an adjoining groove 24 to receive the hairpin type clip 25. For mounting the actuator the shank portion 23 is inserted through an opening in the supporting wall 26 and the hairpin type clip is pushed down in the groove 24 at each side of the fitting to anchor the actuator in place.

To illustrate the operation of the actuator made according to my invention, a two-way valve indicated in its entirety as at 30 is connected to a source of vacuum by means of tube 31 and to the atmosphere as at tube 32 and to the fitting 10 by means of tube 33. The valve 30 includes a valve body 34 having passageways 35 and 36 therein. When the valve handle 37 is turned to its "off" position as shown, the passageways 35 and 36 connect the actuator to atmosphere. When, however, the valve handle 37 and the valve body 34 carried thereby is swung to its "on" position, the passageway 36 is closed and the passageway 35 connects the interior of the actuator 5 to a source of vacuum. When this occurs the atmospheric pressure at the exterior of the actuator flattens the actuator and at the same time elongates the actuator as shown in FIG. 4.

It will be observed that in FIG. 4 the clamps 7 and 8 have moved away from each other and the fitting 12 has approached the fitting 10 so that the motion imparted to the eyelet 14 is the result of the flattening and elongation of the entire actuator body 5. This mode of operation is to be distinguished over actuators wherein a single rubber diaphragm is gripped at its periphery so that the entire motion accomplished by the actuator corresponds to the deformation of a single diaphragm.

In the modification shown in FIG. 5 the actuator body 40 is made from a cut length of hose as in the preferred embodiment and the cut ends are gripped by clamps 41 and 42. The clamping portions 41 and 42 are secured to each other by a backing plate 43. The backing plate 43 is centrally apertured to receive a threaded member 44 which is axially bored at 45 to provide an inlet for the actuator body 40. The member 44 may be anchored in a supporting wall such as the wall 26 shown in FIG. 3. The wall of the actuator opposite the member 43 is provided with a rod 46 which is adapted to be connected to the device which is to be moved by the actuator. The rod 46 is anchored to the wall of the body 40 as shown at 47.

According to my invention the ratio between the length and the diameter of the cut hose is approximately 3 to 1. For example, an extruded rubber tube having an inner diameter of one inch, a wall thickness of about one-eighth (⅛) inch and a length of about 3 inches provides an actuator which operates satisfactorily in response to the vacuum available in an automobile manifold. The rubber tube is characterized by a durometer of 40 to 50.

In the form of my invention shown in FIG. 6, three actuators 51, 52 and 53 are connected in a side-by-side or tandem arrangement. This arrangement is suited for installations where a movement of the actuator hook 54 is required which is substantially three times the amount of movement which might be obtained by a single actuator of the type of FIGS. 1 to 3. The actuator 53 is provided with a solid eyelet member 55 which is secured to the wall of the actuator prior to the closing of the ends by means of clamps 56 and 57. The eyelet 55 secured to actuator 53 is mounted in the supporting wall 58 by means of the hair pin type clip 59 secured to the end portion 60 of the eyelet 55. That wall of the actuator 53 which is opposite the eyelet 55 is connected to the next adjacent actuator 52 by means of the eyelet 61.

It will be understood that the eyelet 61 and the washers carried thereby are secured to the actuators before the ends of the actuators are closed by the metal clips such as 56 and 57. The actuator 52 is in turn connected to the next adjacent actuator 51 by an eyelet 62 and the end actuator 51 of the assembly is provided with an eyelet 63 and the actuator rod 64 having the hook 54 at the end thereof.

The actuator 52 is provided with U-shaped metal end clamps such as indicated at 65 and 66. Similarly the actuator 51 is provided with U-shaped clamps 67 and 68.

To introduce the vacuum line to the actuators 51—52—53, the ends clamps 68, 66 and 57, respectively, are apertured to receive a metal tube as indicated at 69, 70 and 71, respectively. Preferably each of the metal tubes are provided with a sharp point as indicated at 72 to facilitate the insertion of the tubular member after the end of the actuator is clamped by the U-shaped metal clamp. The pressure applied to the rubber within the clamps 68, 66, and 57 causes the rubber to seal around the inlet tube. The outer projecting ends of each of the tubular members 69, 70 and 71 are secured to a rubber tube indicated at 72, 73 and 74, each leading to a separate control valve such as illustrated in connection with the form of FIG. 3. The control valve is in turn connected to a source of vacuum.

In the operation of the device of FIG. 6 it will be understood that the hook 54 may be adjusted to four different positions depending upon the number of actuators connected to the source of vacuum. The position shown in FIG. 6 may be the "full open" position of a damper in a ventilator conduit (not shown). By connecting one of the three actuators such as 51 to the source of vacuum, the member 64 will be moved to an intermediate position, or "two-thirds" open position. Thereafter, by connecting the actuator 52 to the source of vacuum, the damper connected to the hook 54 will be moved to a "one-third" open position. Thereafter, by connecting the actuator 53 to the source of vacuum, the damper connected to the hook 54 will be moved to the "fully closed" position.

Figure 7:
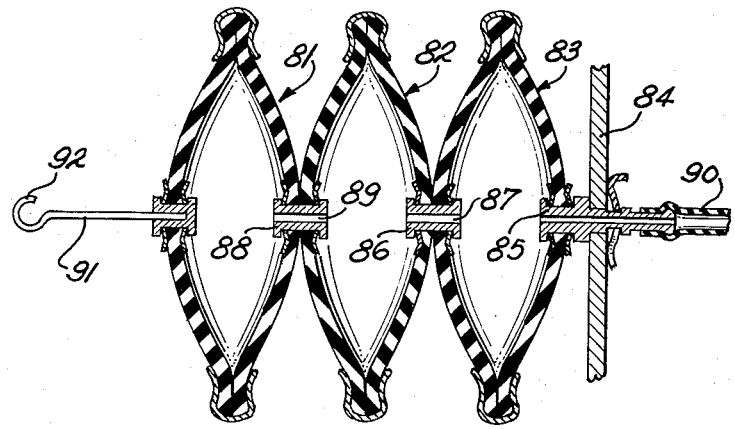
FIG. 7 is a sectional elevation of a tandem arrangement of actuators connected to each other for joint actuation.

Another tandem arrangement producing the total actuator movement corresponding to that of FIG. 6 is illustrated in FIG. 7 wherein actuator 81 is connected to actuator 82 which in turn is connected to actuator 83 mounted on a supporting wall 84 by an eyelet 85. In this form of the invention the eyelet 86, which connects the actuator 83 to the actuator 82, is provided with a bore 87. Similarly, the eyelet 88, which connects the actuator 82 to the actuator 81, is provided with a bore 89 so that the three actuators 81—82—83 are in communication with each other and with the eyelet 85 leading to the source of vacuum as at 90. The actuator rod 91 and the hook 92 carried thereby may then be moved to various positions, depending upon the effective pressure in each of the actuators.

It will be understood from the above discussion of the construction and mode of operation of the forms of FIGS. 6 and 7 that any number of actuators may be connected in tandem to achieve the magnitude of motion required for a particular application.

The alternative construction of the actuator illustrated in FIGS. 8 to 10, inclusive, includes the chamber 100 formed within a piece of rubber tubing of the type described in connection with the form of FIG. 1. The opposite side walls of the actuator as at 101 and 102 are each apertured to receive a tongue 103 carried by a metal plate 104 within the chamber 100. Preferably rubber cement is placed around the aperture in the side wall of the actuator which receives the projecting tongue 103. The rubber cement is indicated at 105. The tongue 103 may be conveniently punched out of the flat metal stock forming the actuator plate 104. The projecting tongues 103 are apertured as at 103a to facilitate mounting the actuator at one side thereof and connecting the actuator to the device to be actuated at the other side thereof.

The ends of the actuator are flattened as described in connection with the earlier embodiments. The flattened portions are clamped in sealing engagement by the U-shaped metal clamps 106 and 107. The clamp 107, the uppermost clamp as viewed in FIG. 8, is provided with a boss 109 which is apertured to receive a tubular inlet pipe 110 which is adapted to be connected to a source of vacuum as described in connection with the first embodiment.

Although I have shown and described certain forms of my invention in considerable detail, it will be understood by those skilled in the art that numerous modifications may be made therein without departing from the scope of the invention as defined in the following claims:

What is claimed is:

1. That method of making an actuator which comprises cutting a length of rubber tubing, forming a pair of opposed openings in the side wall of said cut length intermediate its ends, inserting a first metal fitting through an open end of said cut length and into one of said openings in said side wall of the cut length and inserting a second metal fitting through an open end of the cut length and into said other opening in the side wall of the cut length, and thereafter clamping the ends of said cut length in flat abutting relation to form a closed chamber and connecting the interior of the chamber to a source of vacuum.

2. That method of making an actuator which comprises cutting a length of rubber tubing, forming a pair of openings in the side wall of said cut length intermediate its ends, inserting an inlet fitting having a flanged end through an open end of said cut length and into one of said openings in said side wall of the cut length and inserting a solid fitting through an open end of the cut length and into said other opening in the side wall of the cut length, inserting a mandrel into an open end of said cut length to back up said fittings, securing the fittings in said openings, and thereafter clamping the ends of said cut length in flat abutting relation to form a closed chamber.

3. That method of making an actuator which comprises cutting a length of tubing of rubber-like material, pressing each end of said cut length flat and clamping the flat portions to each other to form a chamber generally circular in its mid-portion and flat at each end, securing fittings in the walls of said mid-portion of said chamber and connecting the chamber to a source of vacuum.

4. That method of making an actuator which comprises cutting a lentgh of tubing of rubber-like material, pressing each end of said cut length flat and securing the flat end portions to each other to form a chamber generally circular in its mid-portion and flat at each end, securing an outlet fitting to said chamber and connecting said outlet fitting to a source of vacuum and connecting a wall of said chamber to a device to be actuated.

5. An actuator comprising a body formed of rubber tubing with the ends thereof pinched together to form a closed actuator chamber, said actuator chamber being normally biased to provide a circular cross-section at the center thereof intermediate said flattened end portions, one wall of said chamber at the mid-portion thereof having an opening, a first metal fitting mounted in said opening and secured to the wall around the opening, said fitting having a projecting shank portion to be mounted on a supporting member, a second metallic fitting mounted in the wall of said actuator chamber opposite said first fitting, means connecting said second fitting to a device to be actuated, a source of vacuum, and valve and conduit means to selectively connect said chamber to said source of vacuum and to the atmosphere.

6. An actuator comprising a body formed of a length of rubber tubing, means to secure the cut ends thereof together to form a closed actuator chamber, said actuator chamber being normally biased to provide a circular cross-section at the center thereof intermediate said end portions, one wall of said chamber at the mid-portion thereof having an opening, a tubular fitting mounted in said opening, a supporting wall, said tubular fitting having a projecting shank portion adapted to be mounted in an aperture in said supporting wall and a groove therein adjacent said shank portion to receive a fastener securing the shank portion of the fitting to the wall, a member mounted in the wall of said actuator chamber opposite said tubular fitting, a link connecting said member to a device to be actuated, a source of vacuum, and two-way valve means and conduit means to connect said tubular fitting selectively to said source of vacuum and to atmosphere.

7. An actuator comprising a body of tubular rubber-like material having flattened end portions and a central portion generally circular in cross-section, U-shaped metal clamps engaging said flattened end portions, said actuator body having an opening therein in the central portion thereof, a fitting secured to said actuator body in said opening, said fitting having a portion projecting from the body for mounting the actuator, an inlet fitting in said actuator body, a source of vacuum, and conduit and valve means connecting said inlet fitting selectively to said source of vacuum and to atmosphere.

8. An actuator comprising a body of rubber-like material having flattened end portions and a mid-portion generally circular in cross-section, clamps engaging said flattened end portions, fittings secured in the walls of said mid-portion of said actuator, a source of vacuum, and means connecting the interior of said actuator to said source of vacuum whereby said body may be flattened and elongated.

9. An acutator comprising a body of rubber-like material having a central portion circular in cross-section and flattened end portions, clamp means at each end of the body securing the flattened end portions to each other, a fitting mounted in the wall of the actuator body in the central portion thereof, an inlet tube in the actuator body, an operating link connected to said fitting, a source of vacuum, and conduit and valve means to connect said inlet tube to said source of vacuum to flatten the actuator body in its central portion and move said end clamp means away from each other.

10. An actuator comprising a body of rubber-like material having a central portion circular in cross-section and flattened end portions, clamp means at each end of the body securing the flattened end portions to each other to form a closed chamber, a tubular inlet fitting in the chamber, an operating fitting mounted in the wall of said actuator body, a source of vacuum, and two-way valve means and conduit means to selectively connect said inlet fitting to said source of vacuum to flatten the actuator body in its central portion or to atmosphere to restore said central portion to its circular cross-section.

11. An actuator comprising a tubular section of rubber-like material, a backing plate having a length corresponding substantially to the length of said tubular section, the ends of said backing plate having U-shaped clamp portions which grip and flatten the opposite ends of said tubular section, said tubular section having an aperture therein in the mid-portion thereof, a tubular inlet fitting mounted in said aperture in the wall of said section, conduit and valve means to connect said inlet fitting to a source of vacuum, and an operating rod mounted on said tubular section opposite the inlet fitting to move a device to be actuated.

12. An actuator comprising a tubular section of rubber-like material, a backing plate having a length corresponding substantially to the length of said tubular section, the ends of said backing plate having U-shaped clamp portions which grip and flatten the opposite ends of said tubular section, said tubular section having an aperture therein in the mid-portion thereof, a tubular inlet fitting mounted in said aperture in the wall of said section, said inlet fitting having a shank projecting through said backing plate, conduit and valve means to connect said inlet fitting to a source of vacuum and an actuator rod connected to said tubular section opposite the inlet fitting to move a device to be actuated.

13. An actuator assembly comprising a first actuator formed of a rubber tube having the ends thereof flattened and sealed, an opening in a side wall of the actuator, a tubular inlet fitting secured in said opening, a second actuator, a tubular eyelet extending through the wall of said first actuator and into said second actuator, means carried by said second actuator for moving a device to be actuated, a source of vacuum and means to connect said source of vacuum to said first actuator.

14. An actuator assembly comprising a series of connected actuators, a first actuator of the series being formed of a rubber tube having the ends thereof flattened and sealed, an opening in a side wall of said first actuator, a tubular inlet fitting secured in said opening, a second actuator in said series, a tubular eyelet extending through the wall of said first actuator into said second actuator, and additional actuator means carried by said second actuator and connected to a device to be moved, a source of vacuum and means to connect said source of vacuum to all of said actuators.

15. An actuator comprising a tubular rubber body, the opposite open ends of said body being brought together and clamped to each other in sealing relation to form an actuator chamber, each of the opposite sides of said chamber being provided with an opening, a pair of metal plates within said chamber respectively adjacent each side thereof, each of said plates having a tongue portion projecting at right angles to the plate and arranged in said opening in the respective side of said chamber, an inlet tube for said actuator, a source of vacuum and means to connect said inlet tube to said source of vacuum to exhaust said chamber and move said plates towards each other.

16. An actuator comprising an elongated tubular rubber body, the opposite ends of said body being flattened, means clamping the flattened ends in sealing relation to form an actuator chamber, each of the opposite sides of said chamber being provided with an opening, a pair of metal plates within said chamber at the opposite sides thereof, each plate having a tongue portion projecting normally from the plate and extending outwardly of said opening in the respective side of said chamber, each plate being disposed against a side wall in said chamber and the tongue of one plate being connected to a device to be moved, an inlet tube for said actuator, a source of vacuum and conduit means to connect said inlet tube to said source of vacuum to exhaust said chamber and move said plates towards each other.

17. An actuator comprising a tube of resilient material, means at each end of the tube holding the opposite sides of the tube flattened toward one another and closing the respective end of the tube, the opposite sides of the tube being bowed away from each other between the ends of the tube, and a fluid fitting on the tube communicating with the interior of the tube for the selective control of the fluid pressure therein.

18. A method of making an actuator which comprises the steps of providing a tube of resilient material, holding the opposite ends of the tube closed, with the opposite sides of the tube at each end flattened toward one another, and leaving the opposite sides of the tube bowed away from each other between the ends of the tube, and providing on the tube a fluid fitting which communicates with the interior of the tube.

References Cited in the file of this patent
UNITED STATES PATENTS

| | | |
|---|---|---|
| 1,806,009 | Whiteacre | May 19, 1931 |
| 2,071,583 | Schutt | Feb. 23, 1937 |
| 2,123,381 | Reichel | July 12, 1938 |
| 2,610,824 | Grier | Sept. 16, 1952 |
| 2,844,126 | Gaylord | July 22, 1958 |
| 2,869,515 | Platzer | Jan. 20, 1959 |
| 2,874,458 | Smith | Feb. 24, 1959 |
| 2,950,609 | Goodloe | Aug. 30, 1960 |